US006516684B1

(12) United States Patent
Chang

(10) Patent No.: US 6,516,684 B1
(45) Date of Patent: Feb. 11, 2003

(54) LOCKING MECHANISM FOR A SHAPER

(76) Inventor: Lee-Cheng Chang, 9F-2, No. 31, Lane 238, Si Ping Road, Taichung (TW)

( * ) Notice: Subject to any disclaimer, the term of this patent is extended or adjusted under 35 U.S.C. 154(b) by 0 days.

(21) Appl. No.: 09/901,002

(22) Filed: Jul. 9, 2001

(51) Int. Cl.$^{7}$ .......................... G05G 1/00; B27C 1/00; B27C 1/12; F16D 1/12; F16B 7/04

(52) U.S. Cl. ................. 74/579 R; 144/130; 144/117.1; 403/110; 403/374.5

(58) Field of Search ........................ 74/579 R; 144/130, 144/117.1; 403/253.2, 110, 343, 109.1, 374.5; 83/438

(56) References Cited

U.S. PATENT DOCUMENTS 4,510,980 A * 4/1985 Barlett et al. ............... 144/1 C
5,771,949 A * 6/1998 Welsh et al. ................ 144/130
6,058,987 A * 5/2000 Liao ........................... 144/130
6,085,812 A * 7/2000 Chiang .................... 144/117.1
6,289,951 B1 * 9/2001 Chiang ....................... 144/130
6,293,176 B1 * 9/2001 Talesky ........................ 83/438
6,340,039 B1 * 1/2002 Chang ..................... 144/253.2
6,394,155 B1 * 5/2002 Wang ......................... 144/130

* cited by examiner

*Primary Examiner*—Vinh T. Luong
(74) *Attorney, Agent, or Firm*—Alan D. Kamrath; Rider, Bennett, Egan & Arundel

(57) ABSTRACT

A locking mechanism includes a seat having four comers each having a tube foamed thereon. Four guide posts of a base of a shaper extend through one of the tubes of the four corners, respectively. Each guide post is clamped by a respective tube when in a locking position. The seat further comprises two longitudinal through-holes each for receiving a connecting rod. Each connecting rod has two ends respectively operatively connected to two of the four tubes of the seat. One of the connecting rods is moved to urge each tube to the locking position. The connecting rods are linked together to thereby allow synchronous movement of the connecting rods. Thus, when one of the connecting rods is moved, all of the lugs are moved to the locking position to thereby synchronously clamp the guide posts of the base.

10 Claims, 8 Drawing Sheets

LOCKING MECHANISM FOR A SHAPER

BACKGROUND OF THE INVENTION

1. Field of the Invention

The present invention relates to a locking mechanism for a shaper for rapidly and easily locking a seat of the shaper.

2. Description of the Related Art

A typical shaper comprises a seat and four guide posts respectively extending through four corners of the seat. After the seat is adjusted to a desired level, a wrench is used to drive a locking nut tooth by tooth, which is troublesome and time consuming. In addition, each of the four guide posts is subjected to an inward force during locking operation. However, the seat cannot be effectively locked in place if the inward force is too small, and the guide posts become inclined toward the seat if the inward force is too large. Thus, the guide posts cannot be maintained parallel to one another after a period of time, and lifting and lowering of the seat are adversely affected.

SUMMARY OF THE INVENTION

An object of the present invention is to provide an improved locking mechanism for a shaper, the locking mechanism comprising a lever for simultaneously moving two locking members which simultaneously tighten four tube of a seat of the shaper via synchronous movement of two connecting rods.

A locking mechanism in accordance with the present invention comprises a seat having four corners each having a tube formed thereon. The tubes are extended through by four guide posts of a base of a shaper, respectively. Each guide post is clamped by a respective tube when in a locking position. The seat further comprises two longitudinal through-holes each for receiving a connecting rod. Each connecting rod has two ends respectively operatively connected to two of the four tubes of the seat. One of the connecting rods is moved to urge each tube to the locking position. The connecting rods are linked together to thereby allow synchronous movement of the connecting rods. Thus, when one of the connecting rods is moved, all of the lugs are moved to the locking position to thereby synchronously clamp the guide posts of the base.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
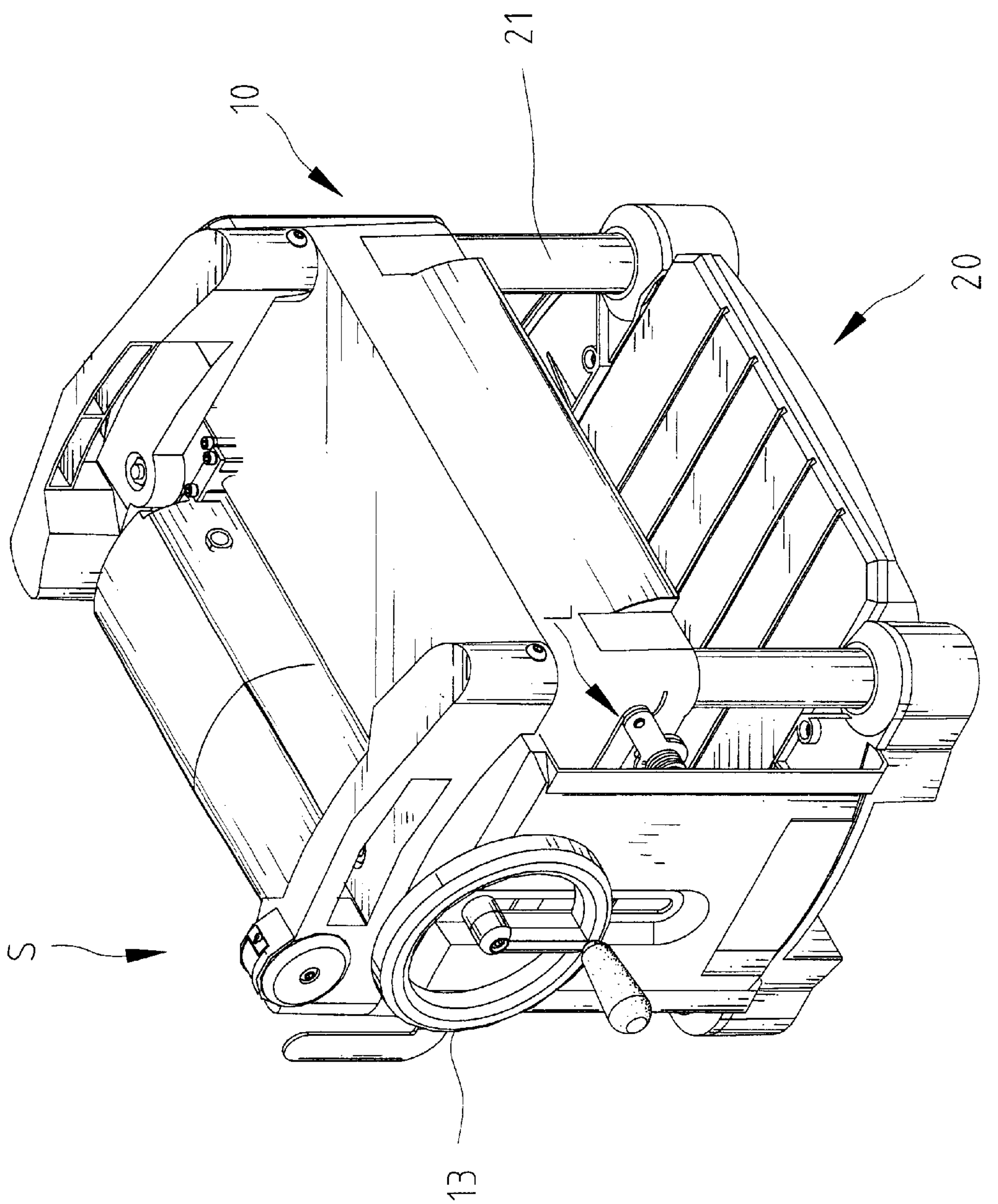
FIG. 1 is a perspective view of a shaper in accordance with the present invention.
Figure 2:
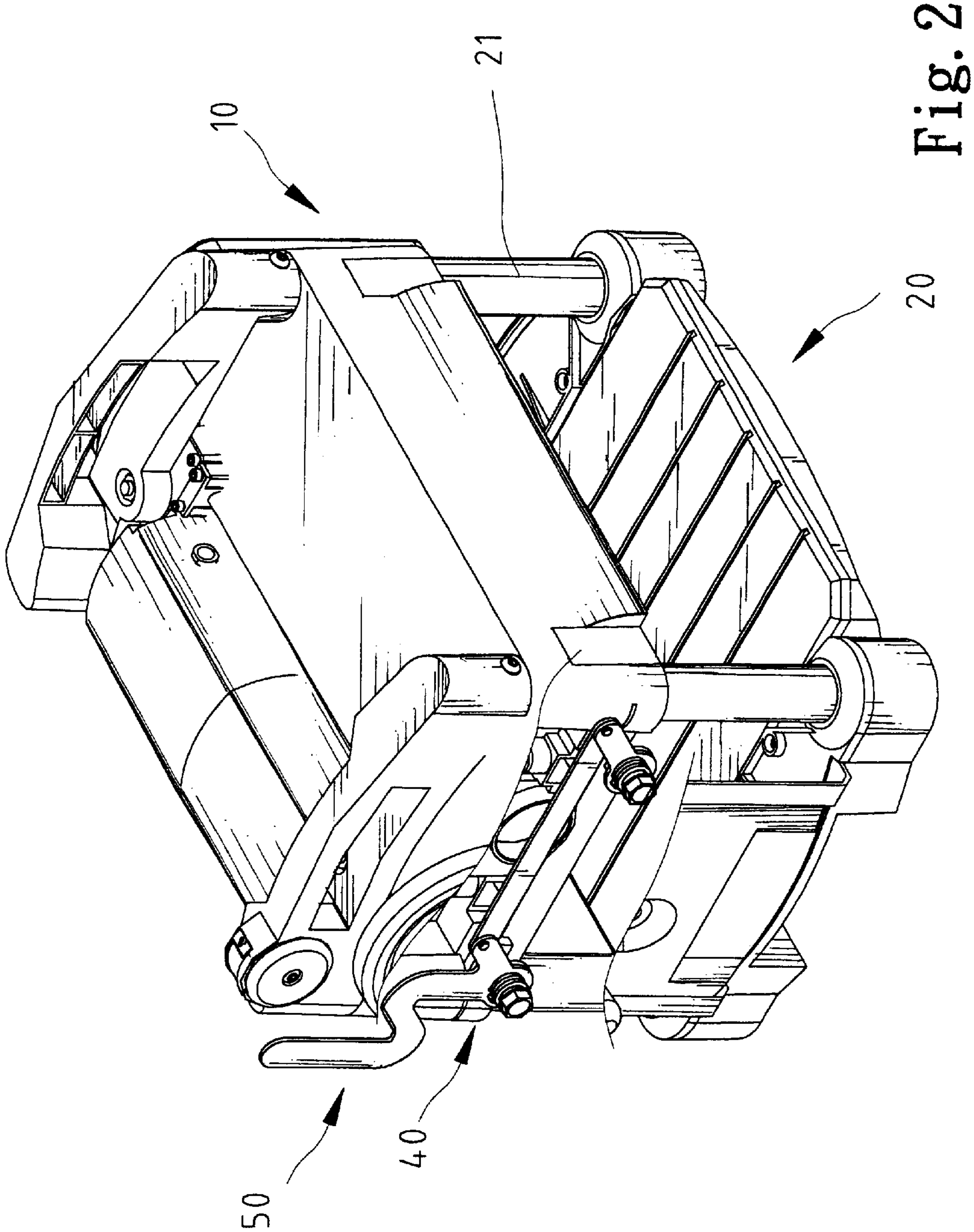
FIG. 2 is a perspective view, partly cutaway, illustrating the interior of a locking mechanism of the shaper in accordance with the present invention.
Figure 3:
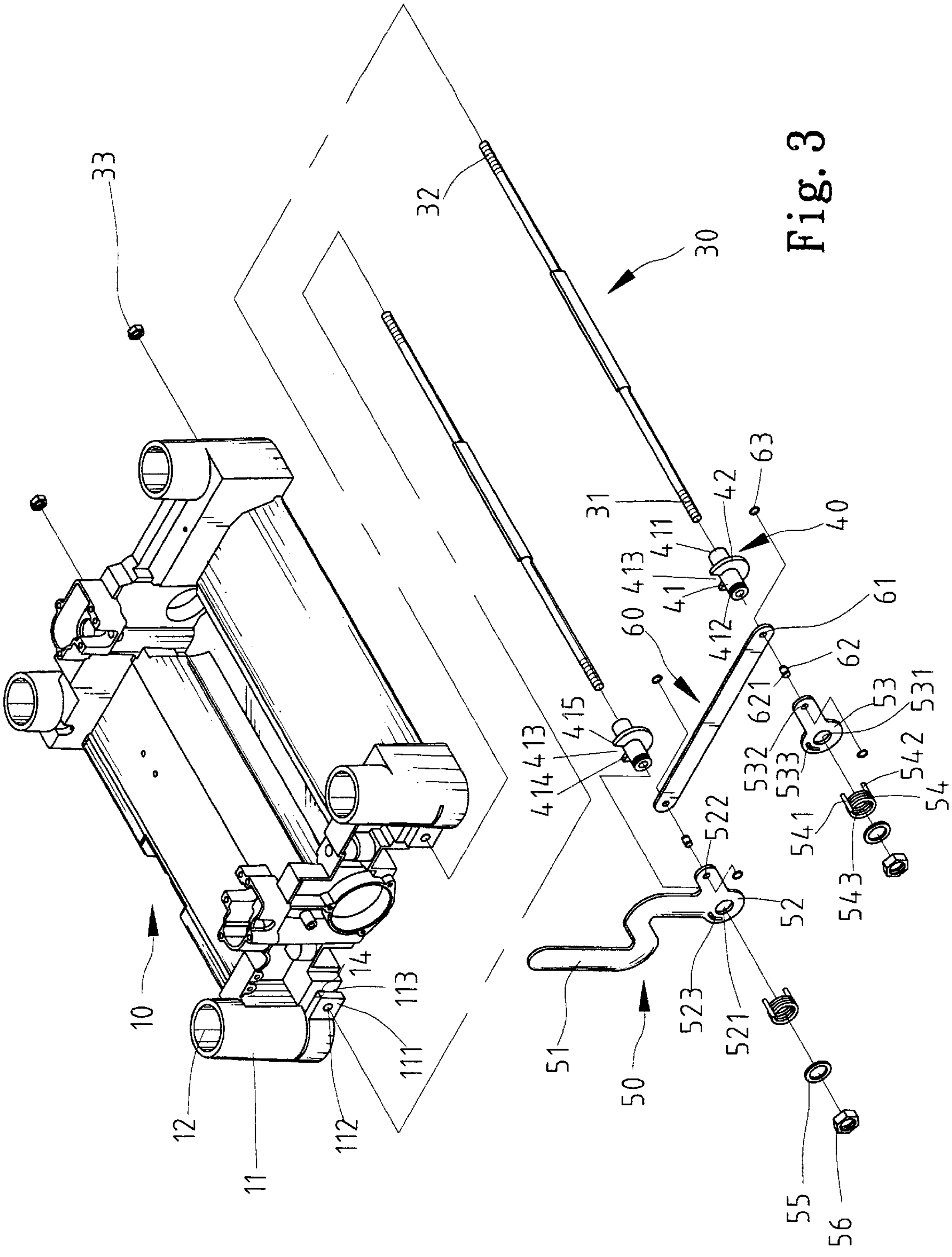
FIG. 3 is an exploded perspective view of the locking mechanism of the shaper in accordance with the present invention.

Referring to FIGS. 1 through 3, a shaper S in accordance with the present invention comprises a locking mechanism L and a base 20 having four guide posts 21. The locking mechanism comprises a seat 10 and four tubes 11 respectively provided to four corners of the seat 10, each tube 11 having a hole 12 through which a respective guide post 21 extends. The seat 10 is moved vertically upon operation of a hand wheel 13, which is conventional and therefore not described in detail.

Figure 5:
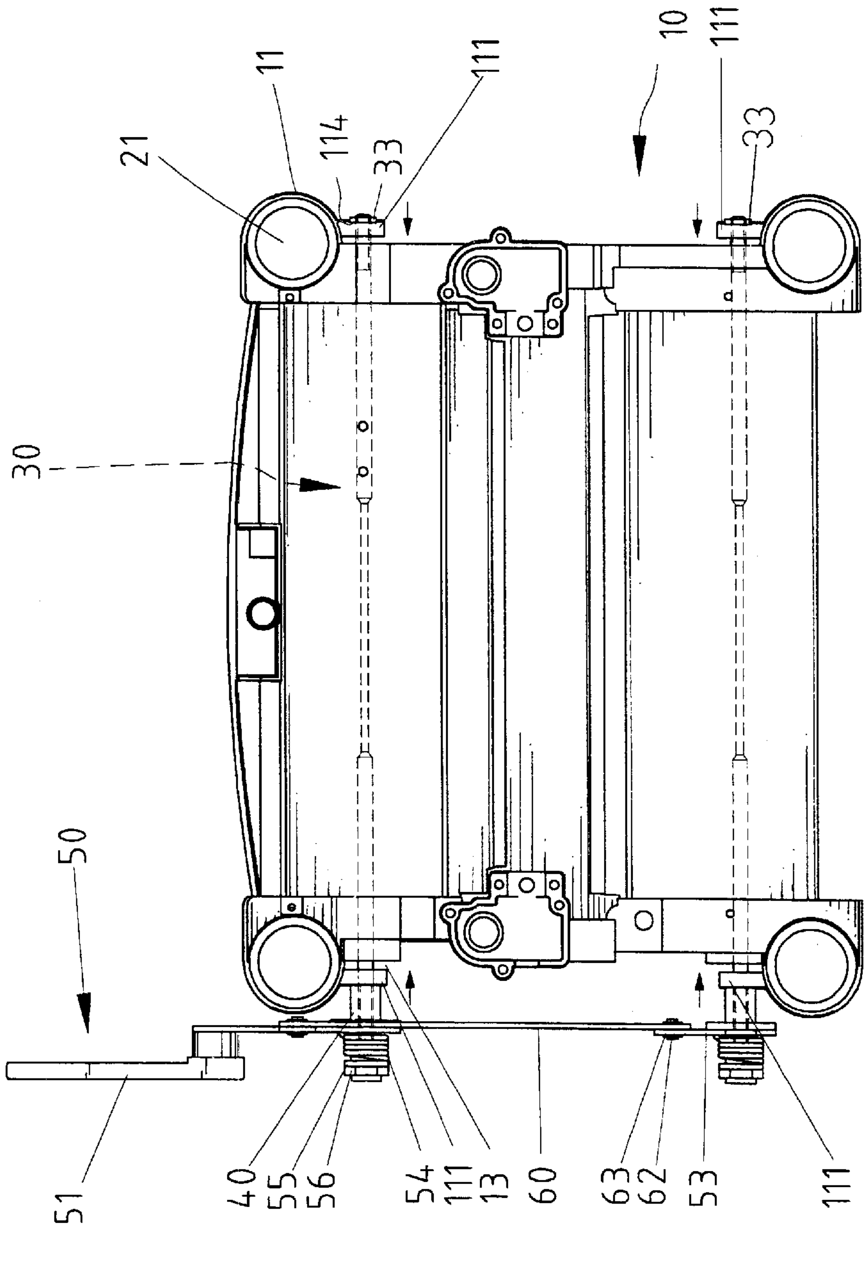
FIG. 5 is a top view of the locking mechanism before locking.

As illustrated in FIG. 3, each tube 11 comprises a lug 111 that has a gap 113 to the seat 10, thereby providing the lug 111 with resiliency, Each lug 111 has a hole 112 that is aligned with a through-hole 14 in the seat 10, the through-hole 14 extending longitudinally from a side of the seat 10 to the other side of the seat 10 Each of two lugs 111 located on the other side of the seat 10 has a recess 114 that faces outside (FIG. 5).

As illustrated in FIG. 3, each tube 11 comprises a lug 111 that has a gap 14 to the seat 10, thereby providing the lug 111 with resiliency. Each lug 111 has a hole 112 that is aligned with a through-hole 14 in the seat 10, the through-hole 14 extending longitudinally from a side of the seat 10 to the other side of the seat 10. Each of two lugs 111 located on the other side of the seat 10 has a recess 114 that faces outside (FIG. 5).

The locking mechanism further comprises two connecting rods 30 slidably received in the through-holes 14 of the seat 10, respectively. Each connecting rod 30 comprises two threaded ends 31 and 32 that are exposed outside the respective through-hole 14 of the seat 10, wherein the threaded end 32 is engaged with a nut 33 that is securely received in the outwardly facing recess 114 of the respective lug 111.

The locking mechanism further comprises two locking members 40 each having a main body 41. The main body 41 has a screw hole 411 in an end face of a first end thereof, an outer threading 412 on a second end thereof, and a sector-like stop 42 on an outer periphery thereof. The screw hole 411 of each locking member 40 engages with the threaded end 31 of the respective connecting rod 30.

The locking mechanism further comprises a substantially N-shape lever 50 having a first operative end 51 and a second engaging end 52 in which a hole 521 is defined. Also defined in the second engaging end 52 are another, second hole 522 and a restraining slot 523. The main body 41 one of the locking members 40 extends through the hole 521 of the lever 50.

An engaging member 53 configured substantially as the second end of the lever 50 is attached to the other locking member 40. The engaging member 53 includes a hole 531 through which the main body 41 of the other locking member 40 extends. Also defined in the engaging member 53 are another, third hole 532 and a restraining slot 533.

The locking mechanism further comprises two elastic elements 54 each having a coil portion 543 and two ends 541 and 542. The ends 541 and 542 of each elastic element 54 are respectively extended through two end portions of the respective restraining slot 523, 533 (see FIG. 4) into a notch 413 in the respective sector-like stop 42, wherein each end 541 and 542 abuts against a respective end wall 414, 415 (FIG. 3) defining the notch 413. The main body 41 of each locking member 40 is extended through the respective hole 521, 531 and the coil portion 543 of the respective elastic element 54 and is then engaged with a washer 55 and a nut 56.

A link 60 includes two ends each having a hole 61. A pin 62 is extended through a hole 61 of the link 60 and the hole 522 of the lever 50, and another pin 62 is extended through the other hole 62 of the link 60 and the hole 532 of the engaging member 53. An O-ring 63 is mounted around an annular groove 621 defined in an outer periphery of each pin 62. Thus, when the lever 50 is manually operated at the first operative end 51, the connecting rods 30 move simultaneously via provision of the engaging member 53 and the link 60.

Figure 4:
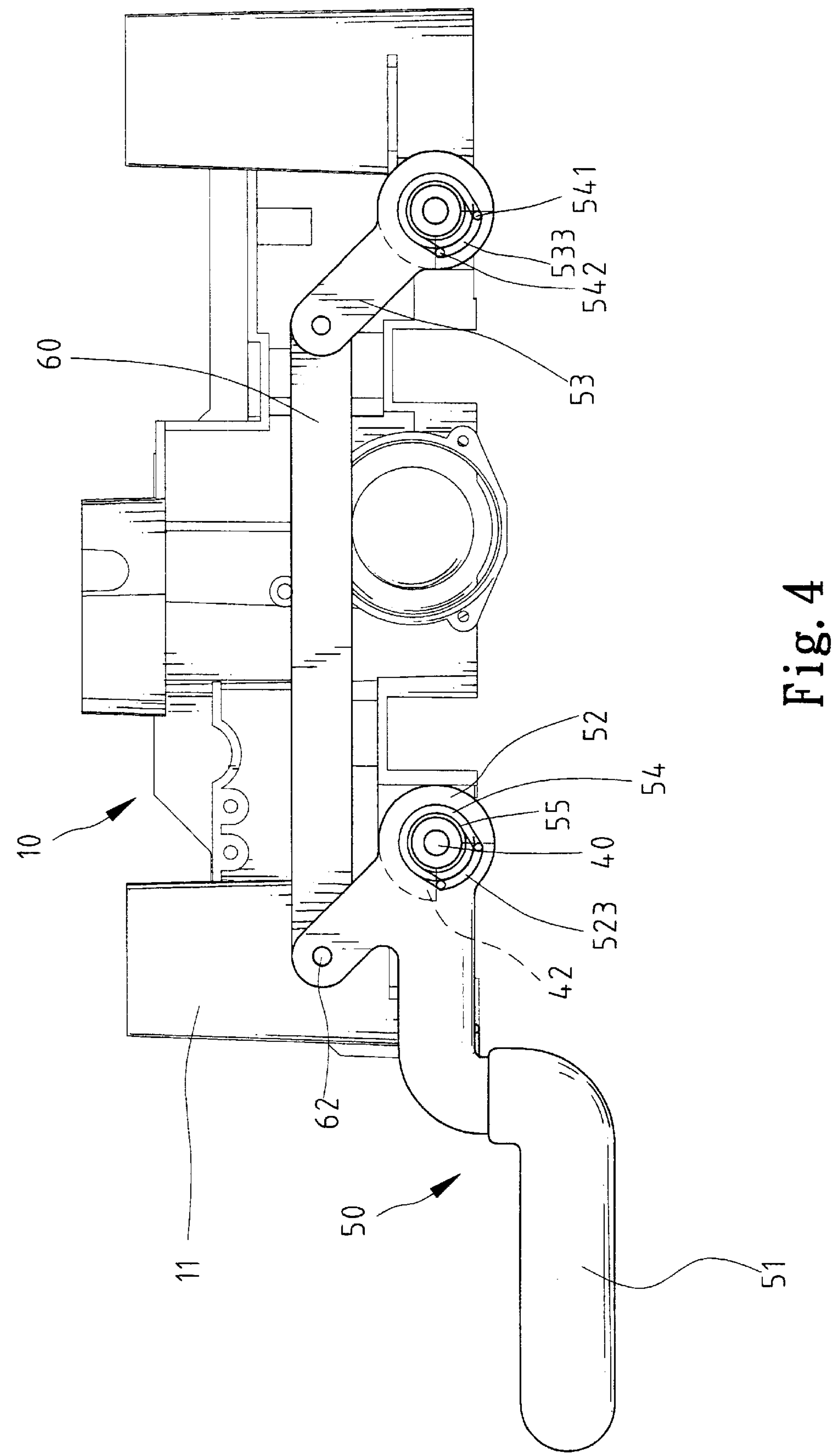
FIG. 4 is a schematic side view of the locking mechanism before locking.

The locking mechanism in FIGS. 4 and 5 is in an unlocked state. The two ends 541 and 542 of each elastic element 54 in the respective restraining slot 523, 533 are spaced apart by 90 degrees. Each guide post 21 is slidable in the respective tube 11 of the seat 10 to allow adjustment in the level of the seat 10 or the base 20.

Figure 6:
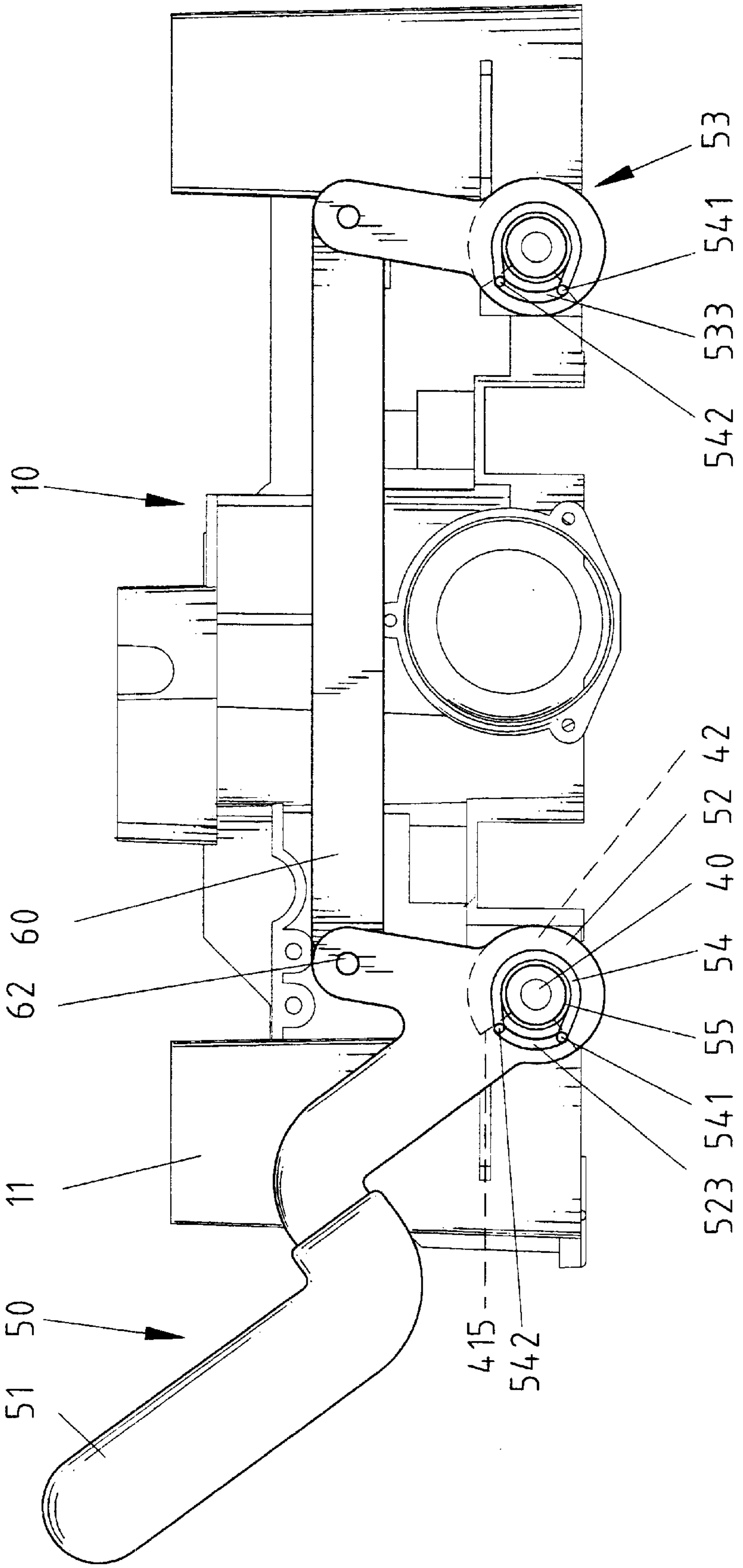
FIG. 6 is a side view similar to FIG. 4, illustrating locking operation of the locking mechanism.

When the seat 10 or base 20 is in the desired level, the operative end 51 of the lever 50 is pivoted, e.g., clockwise, as illustrated in FIG. 6. Since the ends 541 and 542 of each elastic element 54 respectively press against the end walls 414 and 415 of the notch 413 of the respective sector-like stop 42, when the lever 50 is pivoted about an axis of the respective locking member 40, the end 541 of the left elastic element 54 (as viewed from FIG. 6) is moved together with an end edge of the left restraining slot 523 while the other end 542 of the left element 54 presses against the end wall 415 defining the notch 413 of the stop 42 of the left locking member 40, thereby urging the left locking member 40 to turn. The left connecting rod 30 threadedly engaged with the left locking member 40 is thus turned, and the right connecting rod 30 is also turned via transmission by the link 60 and via provision of the engaging member 53, the right elastic element 54, and the right locking member 40. In addition, due to threading engagement between the connecting rod 30 and the respective locking member 40, the locking member 40 (FIG. 5) moves rightward toward the respective left lug 111 while the nuts 33 press against the right lugs 111 and thus urge the right lugs 111 rightward.

Figure 7:
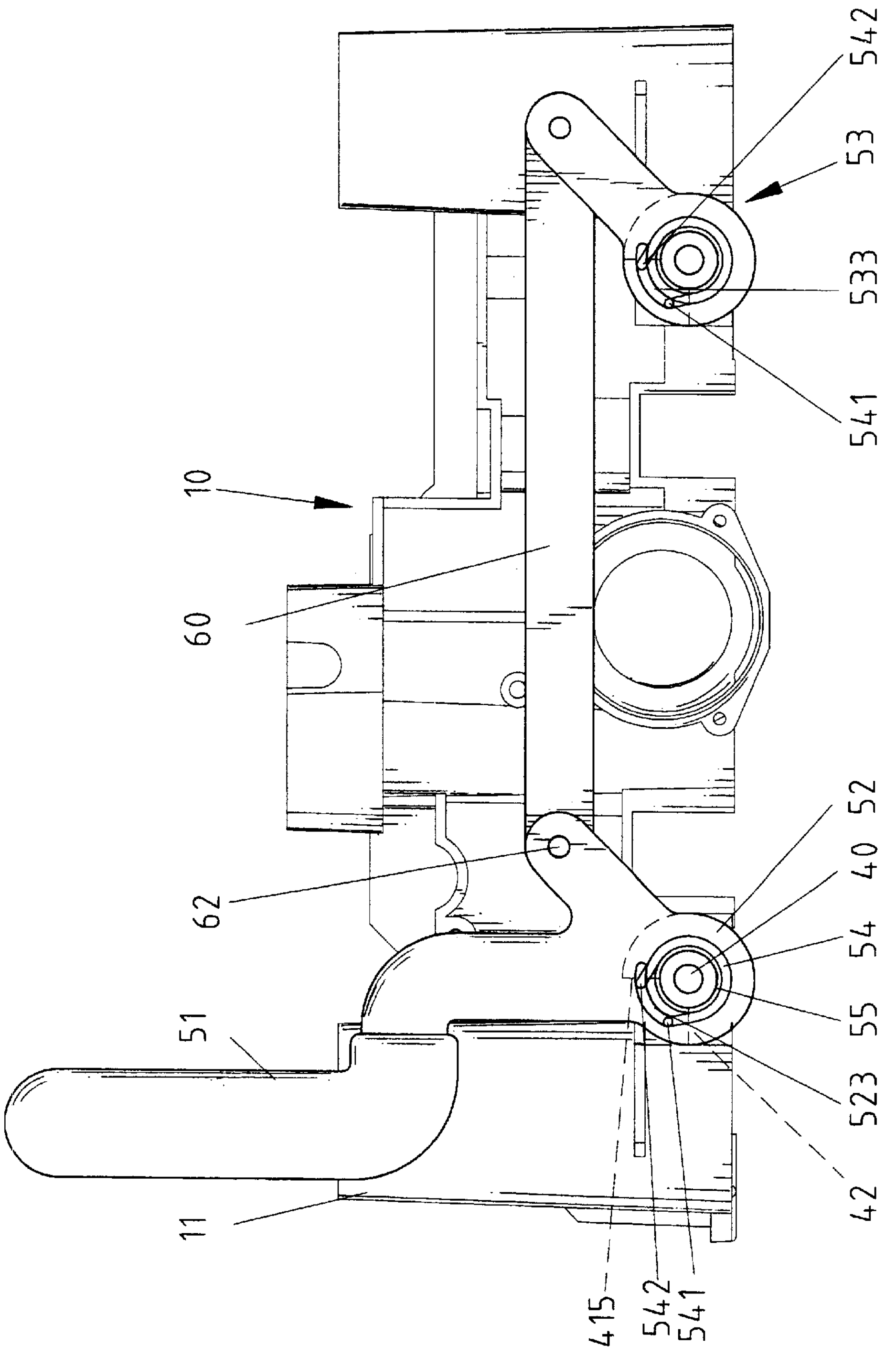
FIG. 7 is a side view similar to FIG. 6, wherein the locking mechanism is in a locked state.
Figure 8:
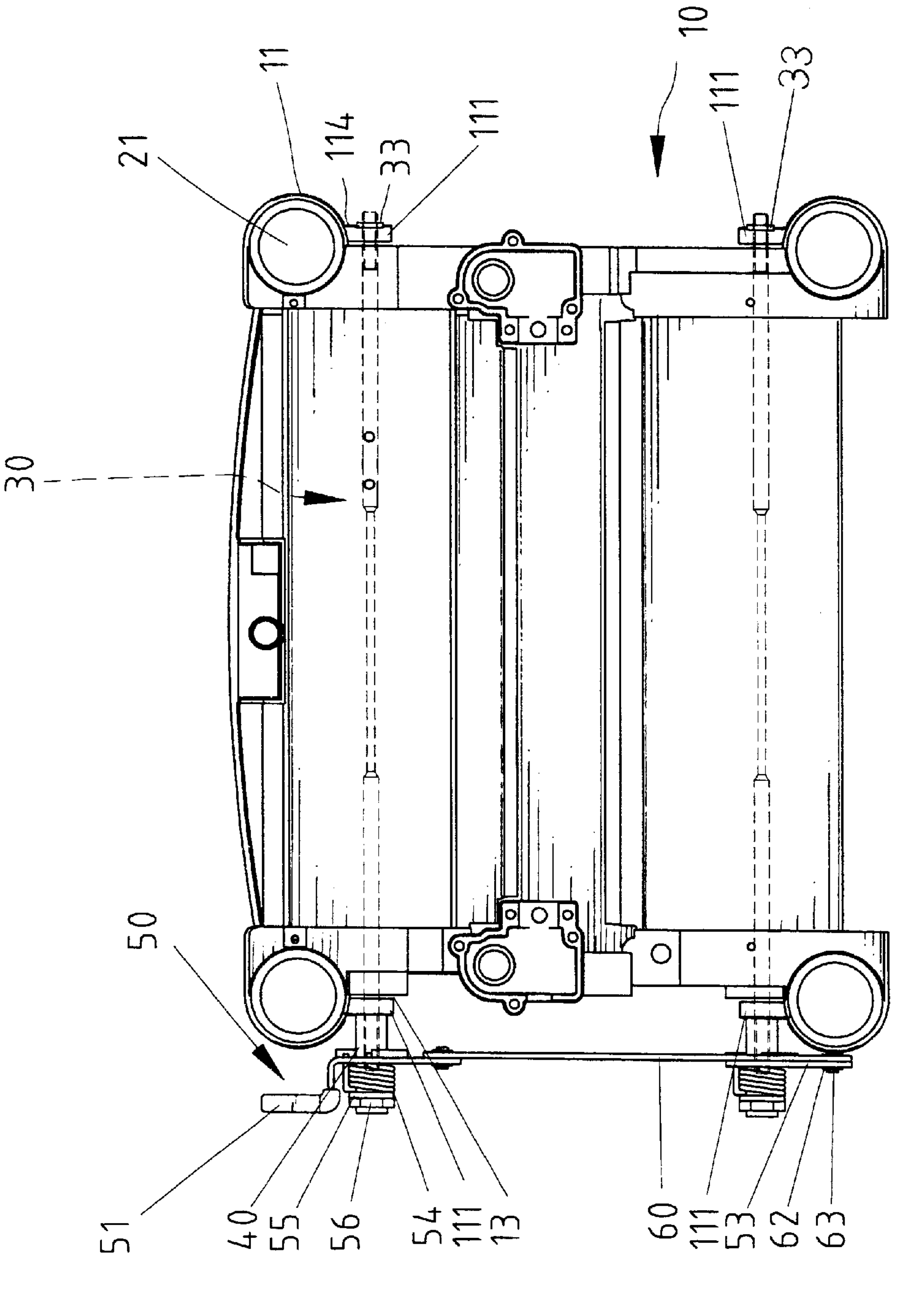
FIG. 8 is a top view of the locking mechanism in a locked state.

Referring to FIG. 7, when the lever 50 reaches an upright position, the two ends 541 and 542 of the respective elastic element 54 in the respective restraining slot 523, 533 are spaced apart by an angle smaller than 90 degrees; namely, the respective elastic element 54 is completely compressed. Each lug 111 on the left side of the seat 10 (as viewed from FIG. 8) is pressed against by the respective locking member 40 (i.e., the gap 113 is reduced) to thereby clamp the respective left guide post 21 (as viewed from FIG. 8) of the base 20 in place. In addition, the nuts 33 urge the right lugs 111 (as viewed from FIG. 8) leftward and thus clamp the right guide posts 21 of the base 20 in place.

Thus, all of the tubes 11 of the seat 10 synchronously clamp the guide posts 21 of the base 20 via synchronous movement of the connecting rods 30 when the lever 50 is moved to the locking position. It is noted that the lever 50, the engaging member 53, and the link 60 can be replaced by other suitable linking mechanism.

Although the invention has been explained in relation to its preferred embodiment, it is to be understood that many other possible modifications and variations can be made without departing from the scope of the invention as hereinafter claimed.

What is claimed is:

1. A locking mechanism for a shaper having a base with four guide posts, the locking mechanism comprising:

a seat having four corners each having a tube formed thereon, with the four guide posts of the base of the shaper extending through a respective tube of the four corners, each said guide post being clamped by a respective said tube when in a locking position, the seat further comprising two longitudinal through-holes;

two connecting rods each of which is slidably received in a respective said longitudinal through-hole of the seat, each said connecting rod having two ends respectively operatively connected to two of the four tubes of the seat;

two locking members each of which has a first end that is threadedly engaged with the first threaded end of a respective said connecting rod, each said locking member further including a second end;

a lever having a first operative end and a second end, the second end of the lever being securely connected to the second end of one of the locking members to move therewith;

an engaging member securely connected to the second end of the other locking member to move therewith; and a link connecting the second end of the engaging member and the second end of the lever, thereby allowing synchronous movement of the locking members and synchronous movement of the connecting rods.

2. The locking mechanism as claimed in claim 1, wherein each said tube has a lug extending outward, a gap being defined between each said lug and the seat, thereby providing the lug with resiliency, each said guide post being clamped in place when said lug of the respective tube is moved to the locking position.

3. The locking mechanism as claimed in claim 2, each said lug comprises a hole, each said connecting rod comprising a first threaded end and a second threaded end that respectively extend through the holes of two of the lugs respectively located on two sides of the seat, a nut being engaged with the second threaded end of the respective connecting rod.

4. The locking mechanism as claimed in claim 1, wherein the second end of each said locking member comprises an outer threading, the second end of the lever comprising a hole through which the second end of said one of the locking members extends, a nut being engaged with the outer threading of the second end of said one of the locking members.

5. The locking mechanism as claimed in claim 4, wherein the second end of the lever comprises a restraining slot, with the locking mechanism further comprising an elastic element having a coil portion and two ends, said one of the locking members extending through the coil portion of the elastic element, said one of the locking members further comprising a notch delimited by two end walls, the ends of the elastic element being extended through the restraining slot and respectively pressing against the end walls of the notch.

6. The locking mechanism as claimed in claim 1, wherein the second end of the engaging member comprises a restraining slot, with the locking mechanism further comprising an elastic element having a coil portion and two ends, the other locking member extending through the coil portion of the elastic element, said other locking member further comprising a notch delimited by two end walls, the ends of the elastic element being extended through the restraining slot and respectively pressing against the end walls of the notch.

7. The locking mechanism as claimed in claim 1, wherein the link comprises two ends each having a hole, the second end of the lever comprising a second hole, the second end of the engaging member comprising a third hole, with the locking mechanism further comprising a first pin extending through one of the holes of the link and the second hole of the second end of the lever, and a second pin extending through the other hole of the link and the third hole of the second end of the engaging member.

8. The locking mechanism as claimed in claim 7, wherein the first pin comprises an annular groove in an outer periphery thereof, with the locking mechanism further comprising an O-ring engaged in the annular groove.

9. The locking mechanism as claimed in claim 7, wherein the second pin comprises an annular groove in an outer periphery thereof, with the locking mechanism further comprising an O-ring engaged in the annular groove.

10. A locking mechanism for a shaper having a base with four guide posts, the locking mechanism comprising:

a seat having four corners each having a tube formed thereon, with the four guide posts of the base of the shaper extending through a respective tube of the four comers, each said guide post being clamped by a respective said tube when in a locking position, the seat Per comprising two longitudinal through-holes;

two connecting rods each of which is slidably received in a respective said longitudinal through-hole of the seat, each said connecting rod having two ends respectively operatively connected to two of the four tubes of the seat;

means for moving one of the connecting rods to urge each said tube to the locking position; and means for linking the connecting rods together to thereby allow synchronous movement of the connecting rods when said moving means is operated, wherein each said tube has a lug extending outward, a gap being defined between each said lug and the seat, thereby providing the lug with resiliency, each said guide post being clamped in place when said lug of the respective tube is moved to the locking position, each said lug comprises a hole, each said connecting rod comprising a first threaded end and a second threaded end that respectively extend through the holes of two of the lugs respectively located on two sides of the seat, a nut being engaged with the second threaded end of the respective connecting rod, wherein two of the lugs located on one of the sides of the seat each include an outwardly facing recess for securely holding a respective said nut.

* * * * *